J. E. RIGHTMIRE.
SURFACING MACHINE.
APPLICATION FILED JUNE 19, 1911.
1,040,419.
Patented Oct. 8, 1912.
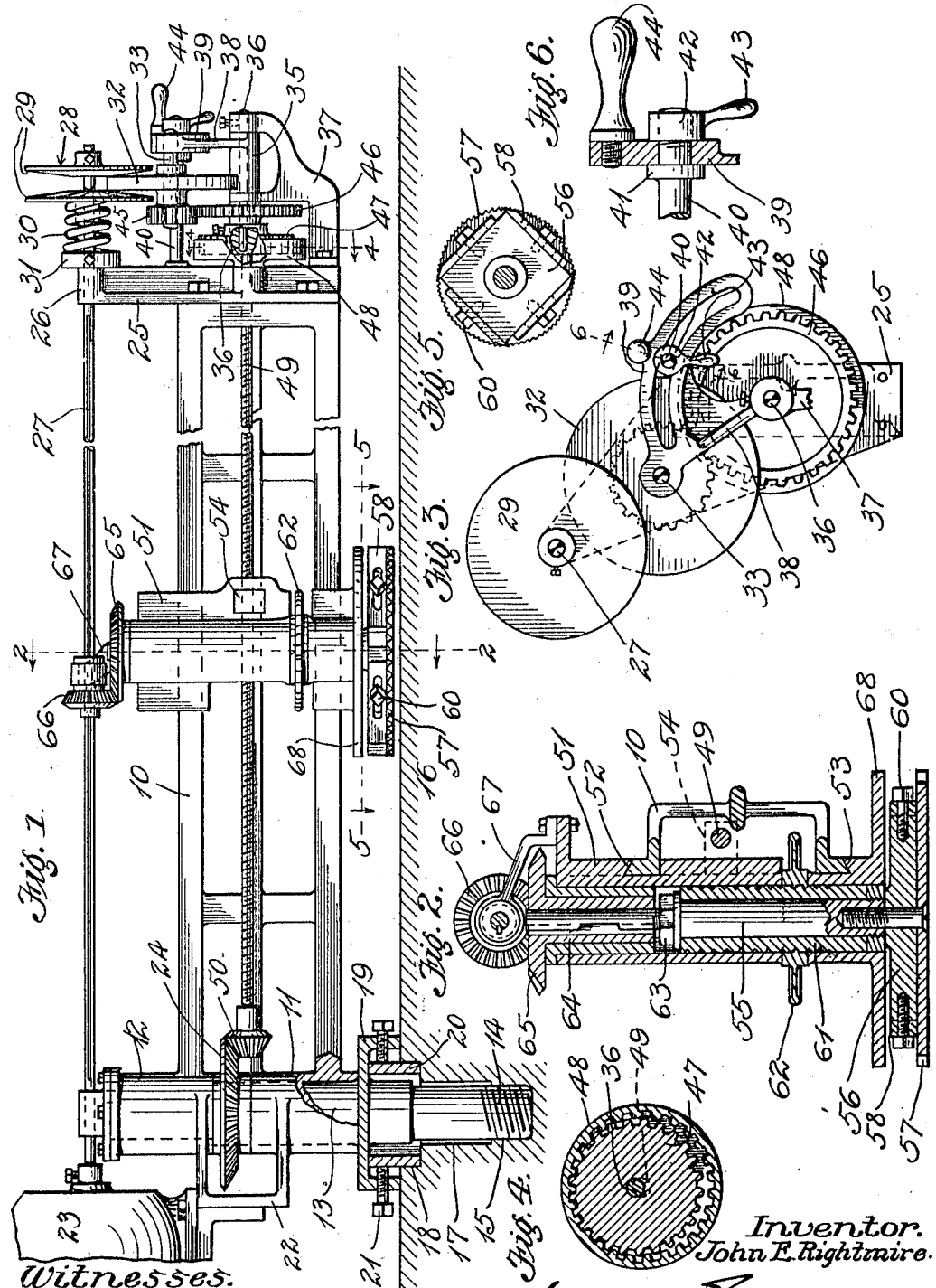
Witnesses.
Inventor.
John E. Rightmire.
By Hazard & Krause
Attys.

UNITED STATES PATENT OFFICE.

JOHN E. RIGHTMIRE, OF LOS ANGELES, CALIFORNIA.

SURFACING-MACHINE.

1,040,419.     Specification of Letters Patent.     Patented Oct. 8, 1912.

Application filed June 19, 1911. Serial No. 633,942.

*To all whom it may concern:*

Be it known that I, JOHN E. RIGHTMIRE, a citizen of the United States, residing at Los Angeles, in the county of Los Angeles and State of California, have invented new and useful Improvements in Surfacing-Machines, of which the following is a specification.

This invention relates to improvements in surfacing machines and particularly to machines that are adapted to cut and produce an even surface upon the top or supporting part of a block, table or other device.

It is particularly the object of the invention to provide a surface cutting and evening device which is readily applicable to the tops or working surfaces of meat blocks such as commonly employed by butchers.

It is an object of the invention also to provide a device which may be mounted upon any meat block or similar surface and so secured thereto, that it may accurately and evenly cut and smooth the upper surface thereof.

It is a further object of the invention to provide a device of this character which is operable with mechanism capable of producing its own rotation as well as the rotation of a cutting implement whereby the surface of a meat block, table or the like may be smoothed.

In the accompanying drawing forming a part of this specification, Figure 1 is a side elevation of the improved surfacing machine applied to a meat block, the block engaging support being shown partially in section. Fig. 2 is a transverse sectional view taken upon the line 2—2 of Fig. 1. Fig. 3 is an end elevation of the surfacing machine looking at the same from the outer end thereof. Fig. 4 is a detail sectional view taken upon the line 4—4 of Fig. 1. Fig. 5 is a detail sectional view taken upon the line 5—5 of Fig. 1. Fig. 6 is a fragmentary detail sectional view taken upon the line 6—6 of Fig. 3.

The details of the invention will now be more particularly described, reference being had to the drawing in which—

10 indicates a frame having sleeve portions 11 and 12 formed thereon and adapted to be journaled upon a central pivot pin 13. The lower end of the pin 13 is preferably reduced and screw threaded at 14 and adapted to be screwed into a socket 15 let into the upper surface of a meat block 16. The said socket 15 is also counter-bored to larger diameters at 17 and 18 for facilitating the adjustment of the pivot pin in its vertical position. The said pivot pin is provided with an annular adjusting flange 19 near its lower end adapted to rest upon the upper surface of the meat block. A collar or ring 20 is usually anchored in the counter-sunk bore 18 and set screws 21 carried by the flange 19 are adapted to bear against the said ring or collar 20 and by their adjustment the pivot pin 13 may be brought to an upright or vertical position. The upper and lower sleeves 11 and 12 are usually braced with respect to each other by means of a bracket 22 which extends beyond the sleeves in diametrically opposite directions from the frame 10 and the said bracket 22 usually has secured to it a motor 23 for actuating the operating mechanism of the surfacing machine. The space between the upper and lower sleeves 11 and 12 is usually filled by the hub portion of a beveled gear 24 which is fast to the said pivot pin and is adapted, as will be hereinafter described, to afford a means by which the meat surfacing mechanism may be caused to rotate over the surface of the meat block. The frame 10 extends laterally from the sleeves 11 and 12 to any desired extent and of course is made sufficiently long to carry the surface cutting or trimming mechanism to the farthest points or corners upon the surface of the meat block.

The outer end of the frame 10 is provided with an end frame 25, which extends above the said frame 10 a suitable distance to provide a journal bearing at 26 for an upper actuating shaft 27 mounted upon the machine. The shaft 27 extends to the motor 23 and is arranged in alinement therewith and so secured thereto that the operation of the motor will produce a rotation of the said shaft. The motor 23 is preferably of the electrical type which readily adapts itself to use upon machines of this character. The outer end of the shaft 27 projects beyond the end frame 25 and is provided with a friction disk mechanism 28 preferably formed with two opposing beveled disks 29 the inner one of which is pressed toward the outer fixed disk by means of a spring 30 which is interposed between said inner disk 29 and a collar 31 secured upon the shaft 27. The disks 29 are adapted to receive a friction gear 32 between them so that in bearing upon the periphery thereof motion will be communito from the shaft 27, through the friction disk mechanism 28, to the said friction gear 32.

The friction gear 32 is mounted upon a shaft 33 fastened to an arm which projects from a sleeve 35. The said sleeve 35 is journaled upon a shaft 36 which is carried by a bracket 37 secured to the end frame 25. The movement of the friction disks 29 is controlled and adjustable by a mechanism carried by the said sleeve 35. An arm 38 projects upwardly from the said sleeve 35 and its upper end engages the shaft 33. Projecting from said arm 38 is a segmental slotted projection 39 which is adapted to engage a stud or portion 40 which projects outwardly from the frame 25. The outer end of the stud or post 40 is provided with an annular shoulder 41 and its outer end beyond said shoulder is screw threaded and fitted with a clamping nut 42 having a handle 43 by which it may be operated. By loosening the clamping nut 42 the arm 38 may be rocked upon the shaft 36, so as to move the friction gear 32 closer to or farther away from the axis of the shaft 27 and thus vary the speed received by the said friction gear from the friction disks 29. The action of the spring 30 will always tend to keep the friction disks 29 against the periphery of the gear 32, no matter how far it may be adjusted from the axis of said disks or how close it may be brought thereto. The clamping nut 42 will hold the arm 38 in its adjusted positions. The segmental projection 39 is preferably provided with a handle 44 by which the said segmental projection and the arm 38 may be moved in adjusting it.

The friction gear 32 carries a pinion 45 which meshes with a gear 46 journaled upon the shaft 36. The said pinion 45 is made somewhat wider than the gear 46 so as to allow for its adjustment in conjunction with the friction gear 32 without danger of moving it out of mesh with the teeth of the gear 46. The shaft 36 also carries a gear wheel 47 which is so connected with the gear 46 as to be turned thereby and the teeth of the gear 47 engage the teeth of an internal gear 48 arranged adjacent thereto. The toothed flange of the said internal gear 48 overhangs the periphery of the gear 47 as shown in Figs. 1 and 4, but the said internal gear 48 is of larger diameter than the gear 47 so that the movement communicated thereto by said gear 47 will be at a slower rate of speed than that at which the said gear 47 moves. The internal gear 48 is secured to a screw shaft 49, which is journaled upon the frame 10 and extends parallel with the shaft 27 toward the pivot pin 13. The inner end of said screw shaft 49 carries a beveled pinion 50 which meshes with the beveled gear 24 which is secured to said pivot pin 13. It will be readily understood that the movement communicated to the pinion 50 through the train of gearing described will cause the said pinion 50 to pull the frame 10 with all the mechanism that it carries around the pivot pin 13.

Movably mounted upon the frame 10 is a cutter frame 51 which has bearings at 52 and 53 upon the upper and lower edges of the frame 10, the said bearings being beveled so as to form a dove-tailed engagement between the parts as illustrated in Fig. 2. The said frame 51 is provided with a block 54 which projects laterally therefrom and is provided with a screw threaded aperture fitting upon the threads of the screw shaft 49, so that when the said screw shaft is rotated the block 54 and the frame 51 actuated thereby, will be moved along the bearings upon the frame 10 in accordance with the direction in which the screw shaft is turned. Within the cutter frame 51 a cutter shaft 55 is mounted with its axis in vertical position and the lower end of said shaft 55 has secured thereto a cutter head 56, which is provided with a saw 57 of circular shape and a series of planing knives 58, which are secured to the faces of the rectangular surface of the said cutter head 56. The said planing knives 58 are preferably slotted and adjustably secured upon the cutter head by means of bolts 60, so that the projection of their cutting edges may be controlled. It will be understood in surfacing a block that the said block generally becomes unevenly worn having hollow surfaces formed therein which are frequently of considerable depth. In resurfacing a block it is therefore necessary to make a cut of considerable depth at times and while the saw 57 will cut to the desired surface in resurfacing the block, the cutters 58 will greatly assist by cutting away the material left above the saw. The shaft 55 is carried by a screw threaded sleeve 61 which has a bearing within the cutter casing 51 and is adapted to be engaged by an adjusting wheel which is internally threaded to engage the threads upon the exterior of said sleeve 61. By turning the said wheel 62 the shaft 55 may be lowered or raised with respect to the cutter frame 51 and for adjusting the cutter head with respect to its work. The shaft 55 is clamped within the sleeve 61 by means of a nut 63 and the upper end of said shaft 55 is reduced and has a splined engagement with the elongated hub 64 of a beveled gear 65 which is journaled in the upper end of the cutter casing 51. The shaft 55 may thus be vertically adjusted with respect to said gear and yet will always be turned thereby, the said gear 65 meshes with a beveled pinion 66 which is carried by a bracket 67 mounted upon the upper end of the cutter casing 51. The said gear 66 also has a splined engagement with the shaft 27 so that the said gear will always be turned by said shaft 27 and yet may slip longitudinally thereof in accordance with the adjustment of the cutter frame 51. The cutter frame 51 is also preferably provided with a horizontal shield plate 68 which projects over the upper surface of the cutter head 56 to prevent the said cutter head from being engaged by anything but the block upon which it is to operate.

The operation of the mechanism it is believed will be readily understood in connection with the above description. The pivot pin 13 is set and adjusted upon the surface of the block or other table which is to be planed and the motor 23 is set in operation, the cutter having been set at one extremity of its path of movement. The operation of the motor will cause the shaft 27 to actuate the gears 66 and 65 for rotating the cutter head and thus cutting the surface of the block which is to be planed. The cutter head is of course first lowered until the depth of cut desired is provided for. The movement imparted through the train of gearing at the outer end of the frame 10 will at the same time rotate the screw shaft 49 so as to gradually cause the said arm 10 to be swung about the pivot pin 13, and thus move the cutter in a spiral manner over the surface that is being planed. The speed with which this feeding movement is accomplished may be increased or diminished as desired by the adjustment of the arm 38 and the friction gear 32 carried thereby as heretofore described. Of course it is preferable to have the swinging movement of the frame 10 comparatively slow whereas the cutter itself may be rotated at a much more rapid rate of speed.

It will be apparent that the device may be readily seated and adjusted upon any kind of a surface which it is desired to level or even. It is however particularly adapted to the resurfacing of butchers' meat blocks which become so uneven in use from time to time.

What I claim is:

1. A surfacing machine, comprising a pivot pin adapted to be mounted upon the material to be surfaced, an adjustable bracing means carried by said pin and having a bearing upon the said material to be surfaced, outside and around the pivot pin, the said pivot pin and bracing means forming the sole support for the machine, a frame pivoted upon said supporting pin and adapted to swing around the same, a rotatable cutter carried by said frame, and a motor also mounted on said frame and adapted to actuate said cutter.

2. A surfacing machine, comprising a pivot pin adapted to be set upon a surface to be planed, adjustable collars surrounding the said pivot pin, one of said collars being rigidly mounted upon the said surface while the other is adjustably carried by the said pivot pin, the collars coöperating to hold the pivot pin in properly adjusted vertical position, a frame journaled upon said pin and resting upon one of said collars, a motor mounted upon the said frame, means operated by the said motor for turning the frame upon the pin, and a cutter movably mounted on said frame and adapted to be operated by the said motor.

3. A surfacing machine, comprising a supporting post adapted to be held in vertical position upon a surface to be planed, an adjustable member carried by the said post and adapted to bear upon the said surface for bracing the post in vertical position, a frame journaled upon said post, gearing carried by the frame and connected with the post for swinging the frame around the same, a rotating cutter mounted upon said frame, gearing for operating the said cutter, and motive means carried by the frame for driving the cutter and moving the frame about the supporting post.

4. A surfacing machine for meat blocks, comprising a center post adapted to be fastened in a recess formed in a meat block, a collar surrounding said post, adjusting screws carried thereby for adjusting the said post to vertical position, a frame journaled upon the said post, a gear fixed to the said post, gearing upon the said frame meshing with the gear of the post and means for actuating the said gearing for turning the frame about the said post, the said post constituting the sole support of said frame and a leveling device therefor.

5. A surfacing machine comprising a post, adapted to be secured upon the surface to be planed, a frame journaled upon said post and extending radially therefrom, a shaft journaled upon the said frame, gearing connecting the said shaft with the post, an actuating shaft also journaled upon said frame, a motor carried by the frame and operating the said actuating shaft, intermediate gearing interposed between the two shafts, a mechanism for controlling the speed communicated from one to the other, the actuating of the gearing and shafts by the motor operating to swing the frame about the post.

6. A surfacing machine for meat blocks, comprising a central post, a frame journaled on said post, a rotatable cutter movably mounted on said frame, a shaft for actuating the cutter, gearing operated by said shaft for moving the frame about the said post, and means also actuated by said gearing for moving the rotating cutter over the surface of the meat block.

7. A surfacing machine comprising a center-post, a frame journaled thereon and adapted to swing about the same, a frame turning shaft journaled upon the frame and capable of effecting the movement of the frame on said post, a motive shaft mounted upon the said frame, means for rotating the same, friction gearing carried by said motive shaft, an adjustable friction gear coöperating with said friction gearing, and reducing gears interposed between the same and the frame turning shaft, the movement of the said motive shaft communicating a slower movement to the frame turning shaft.

8. A surfacing machine comprising a pivoted frame adapted to move about a vertical axis, a sliding cutter mechanism mounted upon said frame having a cutter shaft, a cutter head carried thereby having a horizontal cutting mechanism, and planing cutters arranged adjacent thereto, gearing for rotating the said cutter, and means upon the pivoted frame for turning it on the said axis and for actuating the said cutter mechanism.

9. A surfacing machine comprising a standard, a frame journaled thereon so as to swing about the same, a cutter head longitudinally movable upon said frame, a cutter shaft carrying said cutter head, means for vertically adjusting said shaft and cutter head with respect to the frame and the surface to be operated upon, gearing for actuating said shaft, a power shaft having a splined engagement with head gearing, said shaft operating to swing the frame, move the cutter longitudinally of the frame and rotate said cutter, and a motor for driving the same.

10. A surfacing machine comprising a vertical post, a frame pivoted thereon, a gear secured to said post, a pinion engaging said gear, a screw threaded shaft for driving said pinion, a cutter mechanism movably mounted on said framing and adapted to engage the threads of said shaft, gearing for rotating the cutter mechanism, a shaft for actuating said gearing, a friction gear carried by the latter shaft, a friction gear coöperating therewith, pivoted means carrying said latter gear, means for clamping it in different adjusted positions for changing the speed communicated between said gears and other gears for communicating movement from the friction gearing to the said screw threaded shaft.

11. A surfacing machine comprising a pivoted frame, a pivot support therefor adapted to be mounted upon the surface to be leveled and constituting the sole support of said frame, the frame projecting for the most part to one side of the pivot point, a short portion thereof only projecting upon the other side of said pivot, a balancing motor mounted upon the short end of the frame, and a cutting mechanism carried by the long end of the frame, the motor being adapted to turn the frame and also operating the said cutting mechanism.

12. A surfacing machine, comprising a supporting standard adapted to be adjusted upon the surface to be operated upon, a frame pivotally mounted thereon and carrying a cutting mechanism, mechanism on the frame for rotating the cutting mechanism and moving it back and forth upon the said frame, and a motor mounted upon the frame upon the opposite side of the pivot support from the cutting mechanism, for balancing the frame, and means operated by said motor to turn the frame upon its pivot, feed the cutting mechanism back and forth upon the frame and rotate the said cutting mechanism.

In witness that I claim the foregoing I have hereunto subscribed my name this 9th day of June, 1911.

JOHN E. RIGHTMIRE.

Witnesses:
  E. STADTMAN,
  EARLE R. POLLARD.